US007769691B2

(12) United States Patent
Anders et al.

(10) Patent No.: US 7,769,691 B2
(45) Date of Patent: Aug. 3, 2010

(54) SYSTEMS AND METHODS FOR CONFIGURABLE ENTITLEMENT MANAGEMENT

(75) Inventors: Karen A. Anders, Georgetown, TX (US); Pamela A. Bermender, Leander, TX (US); Phong Anh Pham, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1509 days.

(21) Appl. No.: 10/759,931

(22) Filed: Jan. 16, 2004

(65) Prior Publication Data

US 2005/0160010 A1 Jul. 21, 2005

(51) Int. Cl.
*G06Q 99/00* (2006.01)
*G06Q 30/00* (2006.01)
(52) U.S. Cl. .......................................... 705/52; 705/26
(58) Field of Classification Search ................... 705/26, 705/27, 52
See application file for complete search history.

(56) References Cited

U.S. PATENT DOCUMENTS

| | | | | |
|---|---|---|---|---|
| 6,154,741 | A | 11/2000 | Feldman | 707/9 |
| 6,609,107 | B1 * | 8/2003 | Shim | 705/26 |
| 6,704,787 | B1 * | 3/2004 | Umbreit | 709/229 |
| 6,968,385 | B1 * | 11/2005 | Gilbert | 709/229 |
| 2001/0025260 | A1 * | 9/2001 | Blumofe | 705/27 |
| 2002/0116312 | A1 * | 8/2002 | Talbot et al. | 705/37 |
| 2003/0061111 | A1 * | 3/2003 | Dutta et al. | 705/26 |
| 2004/0039705 | A1 * | 2/2004 | Svancarek et al. | 705/51 |

FOREIGN PATENT DOCUMENTS

EP 808048 A2 * 11/1997

OTHER PUBLICATIONS

Savage, Marcia, "Computer Associates Enters Web Access Management Arena," CRN, Jericho, Dec. 2, 2002, Iss. 1023, p. 78.*

* cited by examiner

*Primary Examiner*—Amee A Shah
(74) *Attorney, Agent, or Firm*—David A. Mims, Jr.

(57) ABSTRACT

Modern enterprises, particularly technology companies, often provide benefits that are sold or given to their customers or partners. For example, an enterprise's customers, or selected subsets of customers, may be entitled to receive product upgrades, product updates or product support. The types and levels of service to which a particular customer is entitled may vary across services and customers. A mechanism is provided to determine, in response to a request for a service, often, but not necessarily, to be delivered electronically, if the requesting recipient is entitled to the service. In determining if the recipient is entitled to the service, an administrator-configurable set of profile attributes values associated with a package of services containing the requested service is compared with corresponding values for said recipient.

5 Claims, 9 Drawing Sheets

SYSTEMS AND METHODS FOR CONFIGURABLE ENTITLEMENT MANAGEMENT

TECHNICAL FIELD

The present invention relates in general to data processing systems, and in particular, to data processing systems for the management and tracking of customer relationship and partner relationship benefits delivered electronically, such as benefits delivered in the form of Web objects or Web content.

BACKGROUND INFORMATION

Modern enterprises, particularly technology companies, often provide benefits that are sold or given to their customers or partners. For example, an enterprise's customers, or selected subsets of customers, may be entitled to receive product upgrades or updates or product support. These examples are typical in the software industry, for example. Similarly, an enterprise's partners may be entitled to receive selected benefits. For example, rather common "partnerships" are developers that write software applications, or develop Web pages, or similar activities using the sponsoring business's development tools. The sponsoring business may provide benefits to its partners that supplement or otherwise augment the business's products and make their application by the user more efficacious. An apparent example is technical support.

As the size of a sponsoring business and its customer and/or partner base increases, customer relationship management and partner relationship management requirements become more complex. Benefits to which a particular customer or partner are entitled (or simply, "entitlements") may vary across customers and/or partners. Additionally, if the customer or partner is itself a large enterprise, the type and quantity of entitlements may differ among the various entities and individuals within the customer or partner. As a consequence, a framework for defining customer/partner benefits and associating particular benefits with parties entitled to access or use them have evolved.

FIG. 1 schematically illustrates an exemplary association of a set of services, service 102, service 104, service 106, service 108 and service 110 and a set of recipients entitled to receive selected subsets of those services, denoted recipient 1-recipient 4. As discussed hereinabove, exemplary services might include technical support, software upgrades, white papers, ancillary software packages, etc. For purposes herein, the particular type or nature of the services is not limiting. Note too, that each service may include a set of objects which might represent Web content, for example, denoted in FIG. 1 in list notation, that is a parentheses-delimited set. Thus, service 102 includes objects (a, b) 112. Service 104 includes a single object 114 (c), service 106, includes three objects (d, e, f) 116. Service 108 includes the single object (g) 118 and service 110 includes objects (a, h) 120. Note that objects are reusable. In other words, an object may be included in multiple services. A service, as used herein, is an abstraction that represents an atomic deliverable to a customer via a benefit delivery system, and maps between the definition of the service and the actual delivery of the service by the benefit delivery system. Thus, for example, a deliverable may be represented in a database as a service with attributes that may include a unique identifier, a short name and a description that may be used to display information about the deliverable to users on a web site, for example.

Services may be combined into a package which may represent an atomic entitled benefit. That is a benefit that has a single set of criteria that once met, permits an entitled recipient to access the services within the package. In the exemplary entitlement structure 100 in FIG. 1, services have been combined into three packages, package 122, package 124 and package 126. Package 122 includes services 102 and 106. Package 124 includes services 104, 106 and 108, and package 126 includes services 108 and 110. An example of a package might be a technical support benefit that may include services which deliver read access to various technology forums, and the ability to ask electronic questions and receive electronic responses. Another package might include some or all of these same services but add a voice support service.

As previously described, a package may represent an atomic entitled benefit, that is, a recipient is entitled to receive services on a per package basis. In exemplary structure 100, entitlement 128 entitles recipient 1 to package 122, entitlement 130 entitles recipient 2 to packages 122 and 124, entitlement 132 entitles recipient 3 to packages 122, 124 and 126 and entitlement 134 entitles recipient 4 to package 126. The associated services, all of which are accessible to the corresponding recipient are indicated in the list notation above each of the respective entitlements 128-134. Thus, for example, recipient 2 via entitlement 130 may access services (a, b, c, d, e, f, g).

Entitlements associate packages of services with recipients. In managing customer and/or partner relationships in a large enterprise, the creation of the entitlements, and the verification of access requests against the entitlements can represent a significant management burden. In particular, as previously noted, the customer and partner base may itself include entities that are also large and include a multiplicity of entities within the enterprise, at least some of which may be entitled to different benefit packages. Additionally, it may be desirable to refine the granularity of the entitlements within a particular organization unit of a beneficiary enterprise. Consequently, there is a need in the art for managing entitlements associated with packages of services and in particular, there is a need in the art for mechanisms by which such entitlements may be flexibly configured without recoding the entitlement system. In other words, a mechanism by which entitlements associated with a package may be readily configured to account for, say, a change in circumstances with respect to the delivery of services within a package. For example, a change in a regulatory or other legal requirement in a particular geographic location may implicate the delivery of one or more services within a package and it may be desirable to configure the entitlements associated with that package accordingly.

SUMMARY OF THE INVENTION

The aforementioned needs are addressed by the present invention. Accordingly, there is provided a method for entitlement management. The method includes, responsive to a request for a service, determining if a recipient identified in the request is entitled to said service. If said recipient is entitled to said service, delivering said service. In determining if the recipient is entitled to the service, a set of profile attributes values associated with a package of services containing the requested service is compared with corresponding values for said recipient. The set of profile attributes is administrator-configurable.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
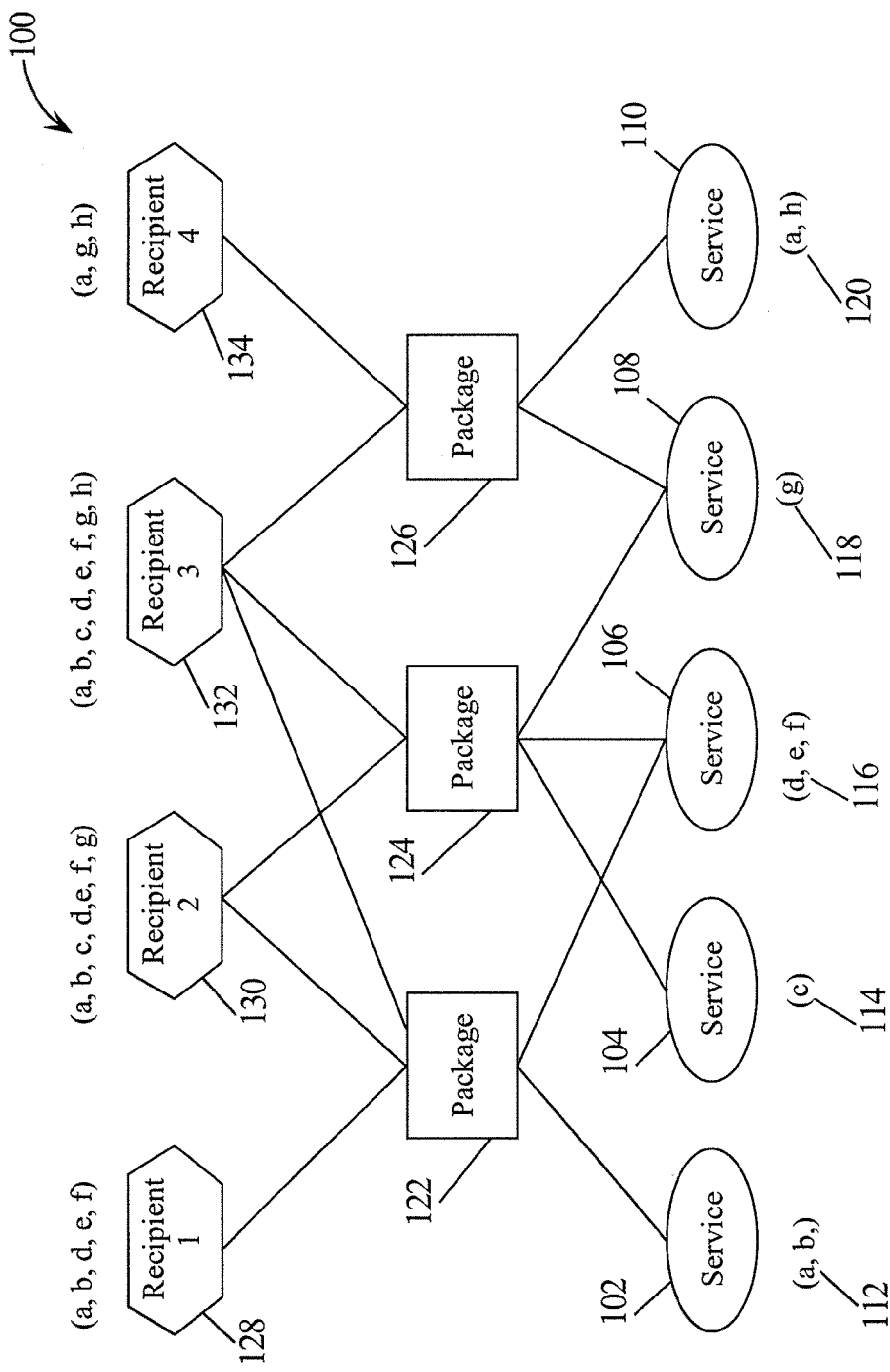
FIG. 1 schematically illustrates a hierarchical framework for associating customer/partner benefits and recipients in accordance with the prior art.

In the following description, numerous specific details are set forth to provide a thorough understanding of the present invention. For example, particular services may be referred to or particular geographic locations may be used to illustrate the present inventive principles. However, it would be recognized by those of ordinary skill in the art that the present invention may be practiced without such specific details, and in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

Figures 2A, 2B:
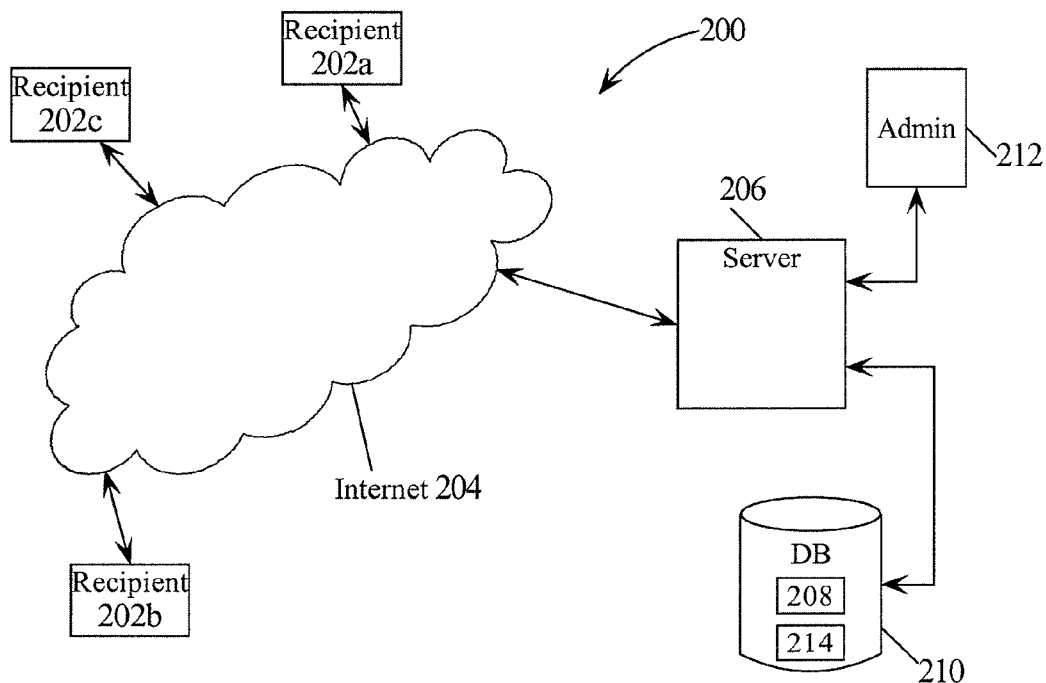
FIGS. 2A-2C illustrates, in a high-level block diagram form, an architecture for delivering customer/partner benefits in accordance with an embodiment of the present invention.

FIG. 2A illustrates a high-level architecture for delivering entitlements to customers/partners which may be used in accordance with the present inventive principles. A recipient of an entitlement, illustrated by recipients 202a-202c via requests over a network, here Internet 204, to server 206. As discussed hereinabove, the particular services that are available to a recipient may be aggregated in a package which represents an atomic entitled benefit. A particular recipient may only access services corresponding to a package for which that recipient is entitled. Server 206 may determine a recipient's entitlement with respect to a requested Web object or Web content in a service via an associated package record 208 stored in database 210 which includes a repository of such package records. Additionally, database 210 may include customer or partner profile(s) 214.

Figure 2C:
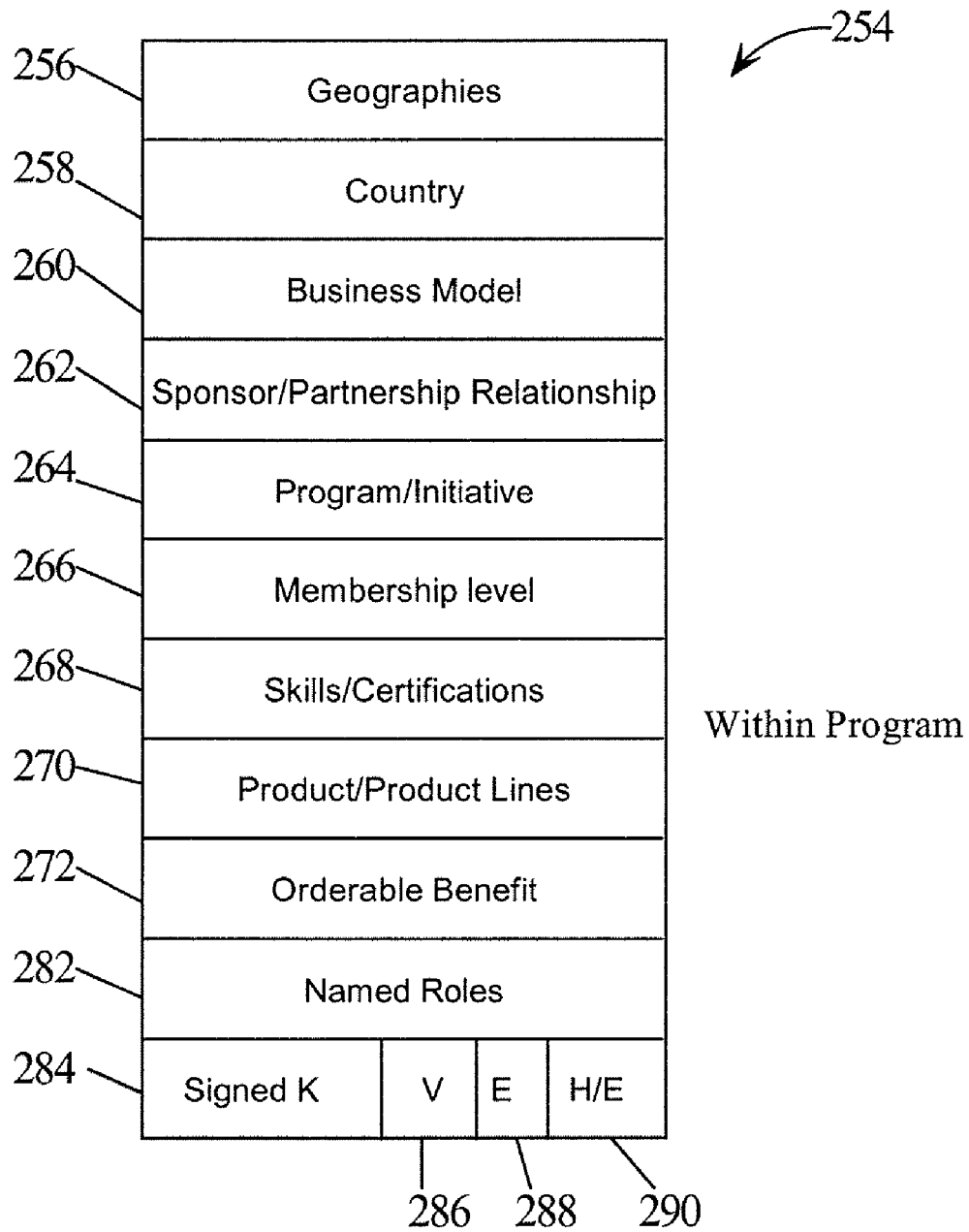

FIG. 2B illustrates an exemplary package record 208 in accordance with the present inventive principles. Each such package of services that may be made available to an enterprise's customers or partners may be represented in database 210 as a corresponding package record 208. The package record may include a package identifier 252 and a set of profile attributes 254. Profile attributes represent criteria that effect the entitlement. That is, the attributes represent characteristics associated with recipient enterprises and, additionally, the target contacts within those enterprises and corresponding values. As described further hereinbelow in conjunction with FIGS. 4-6, matching a profile of a requesting recipient with the values of the profile attributes for a package to verify the entitlement. Referring to FIG. 2C, an exemplary set of profile attributes 254 are illustrated. Note that values of a particular attribute may be single or multi-valued. For example, attribute 256, Geographies, which may refer to a multi-country region, such as a continent, North America, Europe, etc., may take multiple values. In other words, a particular package may be entitled with respect to recipients in a plurality of geographies, e.g., North America or Europe. As will be discussed further hereinbelow, a requesting recipient meeting either value of a multi-valued profile would satisfy a matching criteria with respect to that attribute. Additional granularity may be provided by country attribute 258. Business model attribute 260 may correspond to the type of business model of the target customer/partner. For example, consultant, developer, distributor, education provider, integrator, reseller, service provider, etc. Attribute 262 may be the sponsor/partner relationship. For example, in a partner relationship, the partner might have a reseller, distributor or developer relationship with the sponsoring business, or the partner may participate in a specific named initiative program of the sponsoring business. The specific program or initiative may be included in the program attribute 264. Additionally, a benefit program may have a tiered membership level, criteria 266. For example, in a partner relationship, the partner might have, for example, a "Gold," "Silver" or "Bronze" reseller relationship. Levels indicate the tiered relationship between the partner and the sponsoring business. Levels may be set by the sponsoring business in accordance with criteria that may include revenue generated by the partner or the partner's commitment to the sponsoring business' technologies and/or strategies, or a combination of such criteria. Criteria 268 represents skills or certifications that a sponsoring business may require the partner to have to entitle a recipient to the corresponding package. For example, a user might be a certified database administrator and an entitlement aimed at such certified administrators may include skills/certifications attribute with the corresponding value representing the type or level of skill/certification. Alternatively, an enterprise or a particular location of an enterprise may receive an entitlement if it has a predetermined number of contacts, which hold a specified certification attribute. Other criteria may include specific product lines or products of the sponsoring business that the customer or partner might be authorized to resell attribute 270, a particular benefits package (272) that the customer might have purchased, and a named role attribute 282, that a user might be assigned. The profile may also include an attribute 284 indicating the existence of a signed contract or agreement and may additionally tag whether the contract is valid (286), expired (288) and if the contract is signed electronically or in a hard copy signature (290). It would be recognized by those of ordinary skill in the art that the foregoing criteria constituting a package profile are exemplary, and other, alternative, choices of criteria would fall within the spirit and scope of the invention.

Figure 3:
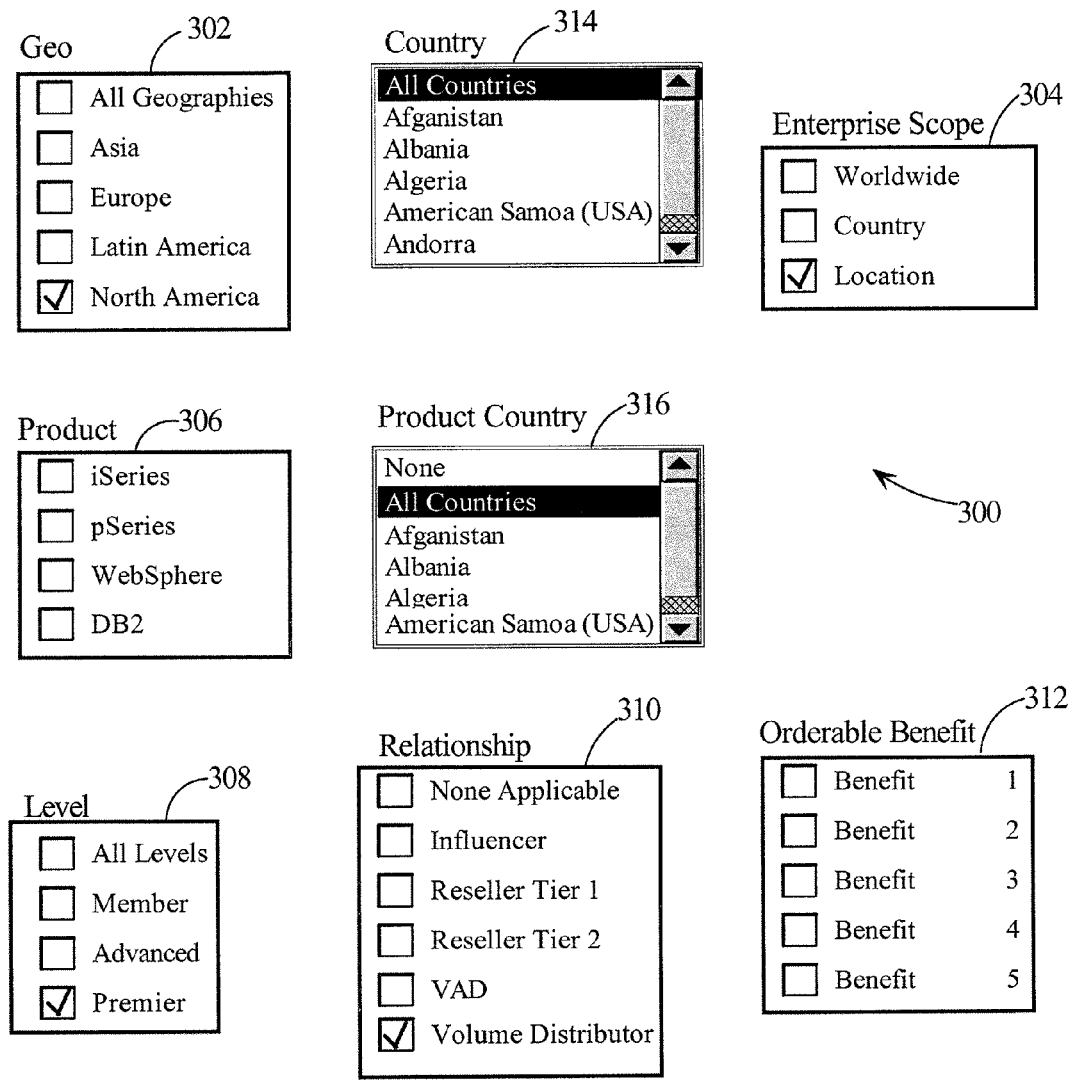
FIG. 3 illustrates an exemplary screen shot of a graphical user interface (GUI) which may be used in conjunction with the architectures on FIGS. 2A-2C.

Returning to FIG. 2A, attributes may be specified by the program administrator 212 in establishing a particular benefits program and the services and packages of services offered therein. A graphical user interface (GUI) may be provided to permit the rapid selection of values for an attribute profile for a particular entitlement. An exemplary GUI 300 is shown in FIG. 3. GUI 300 includes selection mechanisms for the geography attribute (302), enterprise scope (304), product (306), membership level (308), partner relationship (310), and orderable benefit (312) which use a checkbox selection. Additionally, GUI 300 includes a selection mechanism for the country attribute (314) and a product country attribute (316), which use a scrollable listbox mechanism to select the criteria value for the entitlement being established. The logic to display a GUI such as GUI 300 and the checkbox/listbox mechanisms therein would be understood by persons of ordinary skill in the programming art.

Figure 4:
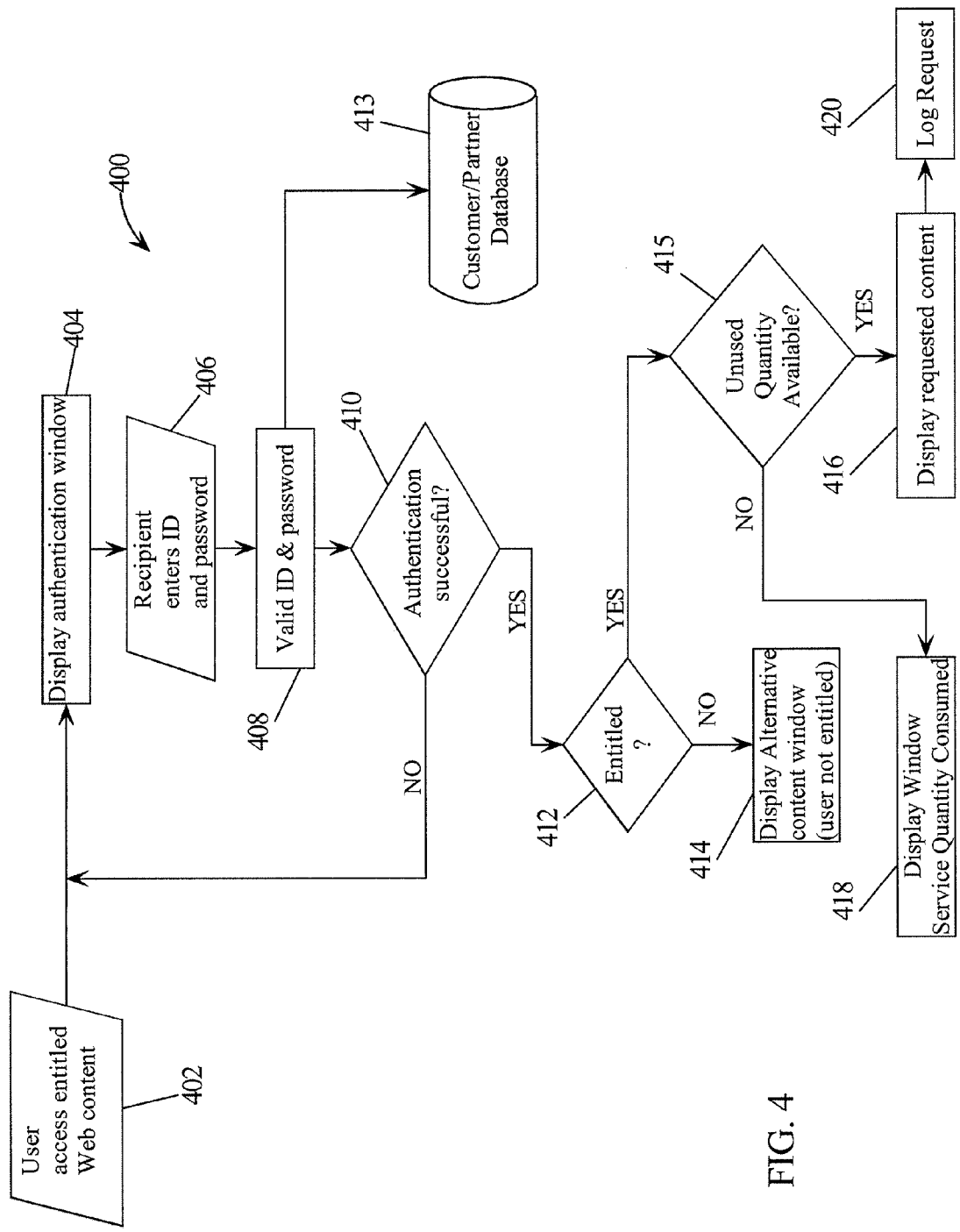
FIG. 4 illustrates, in flowchart form, a methodology for delivering a service to a recipient in accordance with an embodiment of the present invention.

The profile criteria described in conjunction with FIGS. 2 and 3 may be used to determine the accessibility of a particular package to a requesting recipient. Referring now to FIG. 4, there is illustrated therein a methodology 400 for delivering an entitlement in accordance with the principles of the present invention. In step 402, a user requests access to entitled Web content. An authentication window is displayed, in step 404, and in response thereto the recipient enters an ID and password, step 406. In step 408, the ID and password are validated, and if successful, step 410 process 400 proceeds to determine if the recipient is entitled to the requested content, step 412. Conversely, if the recipient is not authenticated, process 400 returns to step 404.

Returning to step 412, as described further in conjunction with FIG. 5 hereinbelow, the attribute profile for the package containing a service associated with the Web content requested, may be used to ascertain the recipient's entitlement. If the requesting recipient is not entitled to the requested Web content, a window indicating alternative content may be displayed in step 414. Such alternative content may include a description of the criteria associated with the requested benefit, and additionally, may describe how to meet these criteria. In this way, it is indicated to the recipient that he or she is not entitled to the requested benefit. If, however, the requesting recipient is entitled, in step 415 it is determined if an unused quantity is available for the requested service. Step 415 provides for "consumable" services whereby the amount of an entitlement available to a customer or partner, for example, may be limited. Note that the resource need not necessarily be limited generally, but the amount available to a recipient may be limited by contract. A limited number of technical support requests and a fixed number of free software upgrades are exemplars of such resources. In principle, these resources could be provided without restriction as to number, however, it is typical that by agreement, these resources are made available to any particular customer/partner in limited amounts.

If there is, in step 415, an unused quantity available, the requested content is displayed in step 416. Otherwise, the recipient is notified that the service quantity is already consumed, step 418.

In step 420, the use of the requested content is logged. Additionally, a tracking count value may be decremented, if the number of accesses is limited. In this way, "consumable" services, as discussed in conjunction with step 415, may also be accounted for.

Figure 5:
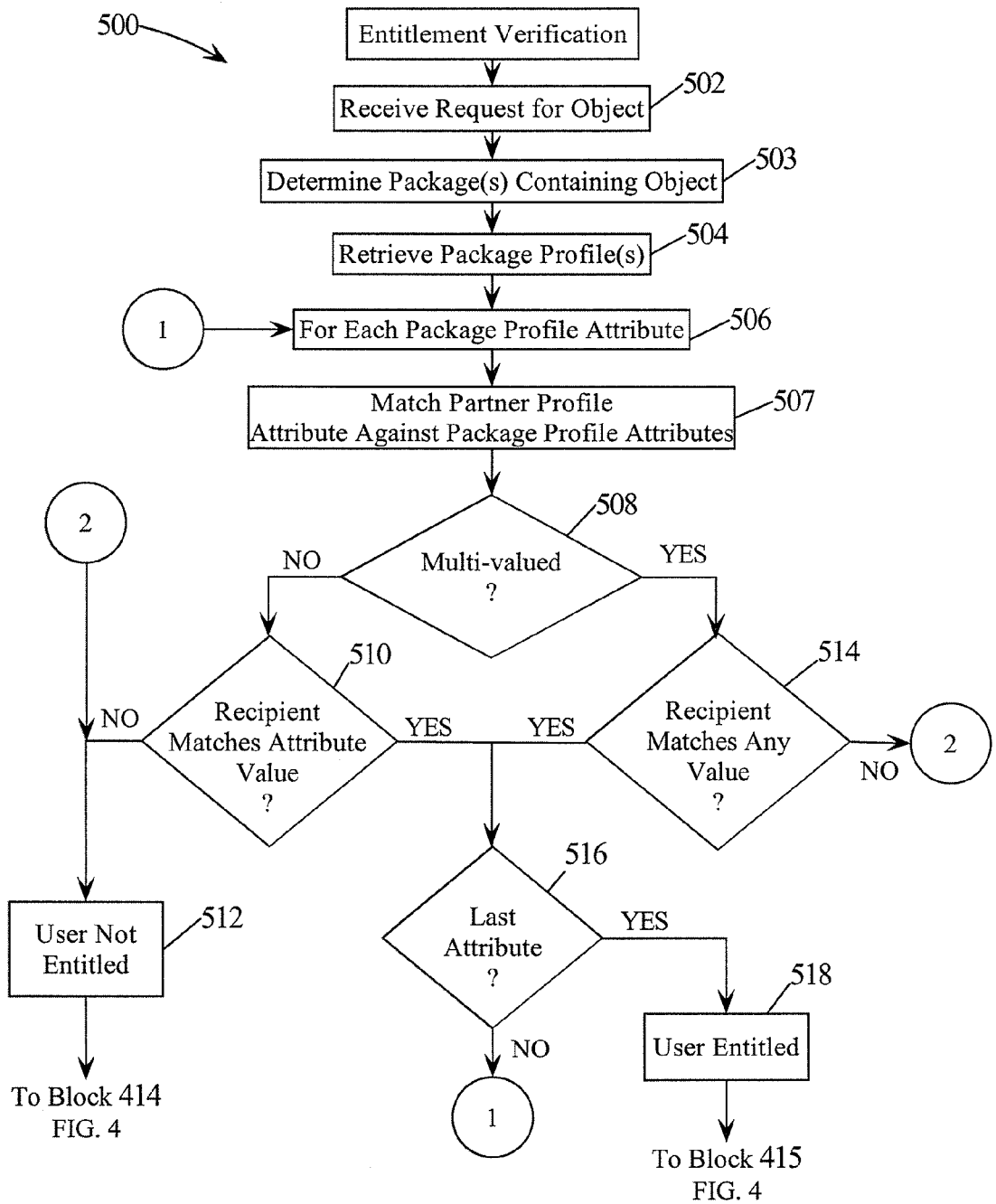
FIG. 5 illustrates, in flowchart form, a portion of the methodology of FIG. 4 in further detail.

Refer now to FIG. 5, illustrating in flowchart form, a methodology 500 which may be used for entitlement verification, for example in conjunction with step 412, FIG. 4.

In step 502, a request for a Web object (equivalently, service) is received. Recall that a package is the atomic entitled benefit and a particular service may be included in more than one package. Thus, in step 503, the package or packages containing the Web object requested in step 502 is determined.

In step 504, a profile (or profiles) for the package(s) identified in step 503 are retrieved. The package profile may be in accordance with the embodiment discussed in conjunction with FIGS. 2A-2C.

In step 506, a loop over each package profile attribute is entered. In step 507, the partner profile attributes are matched against the package profile attributes. A methodology for hierarchical matching is described in conjunction with FIG. 6. In step 508, it is determined if the attribute is multi-valued. (An attribute that is not multi-valued may be single valued, by default.)

If the attribute is single valued ("No" branch in step 508), it is determined if the value of the corresponding attribute in the recipient profile matches the value in the package profile. (If the attribute does not appear in the recipient profile, that is an immediate mismatch.) If, the values do not match, the user is not entitled to the package, step 512. Process returns to block 414, FIG. 4.

Returning to step 508, if the attribute is multi-valued ("Yes" branch in step 508), it is determined (step 514) if the recipient matches any of the attribute values. That is a logical "OR" relationship of the multiple attribute values. If not, or if as before the recipient profile does not include the attribute, the user is not entitled, step 512.

If in either the single-valued attribute case or the multi-valued attribute case, a match is found ("Yes" branches of steps 510 and 514) in step 516 it is determined if all attributes in the package attribute profile have been tested. If not, process 500 returns to step 506 to continue the loop over the attributes. Conversely, if the last attribute has been tested (and matched to reach step 516), process 500 breaks out of the loop via the "Yes" branch of step 516 and the user is entitled to the package, step 518. (In this way there is an "AND" relationship between package attributes.) Process 500 returns to block 415, FIG. 4.

Figure 6:
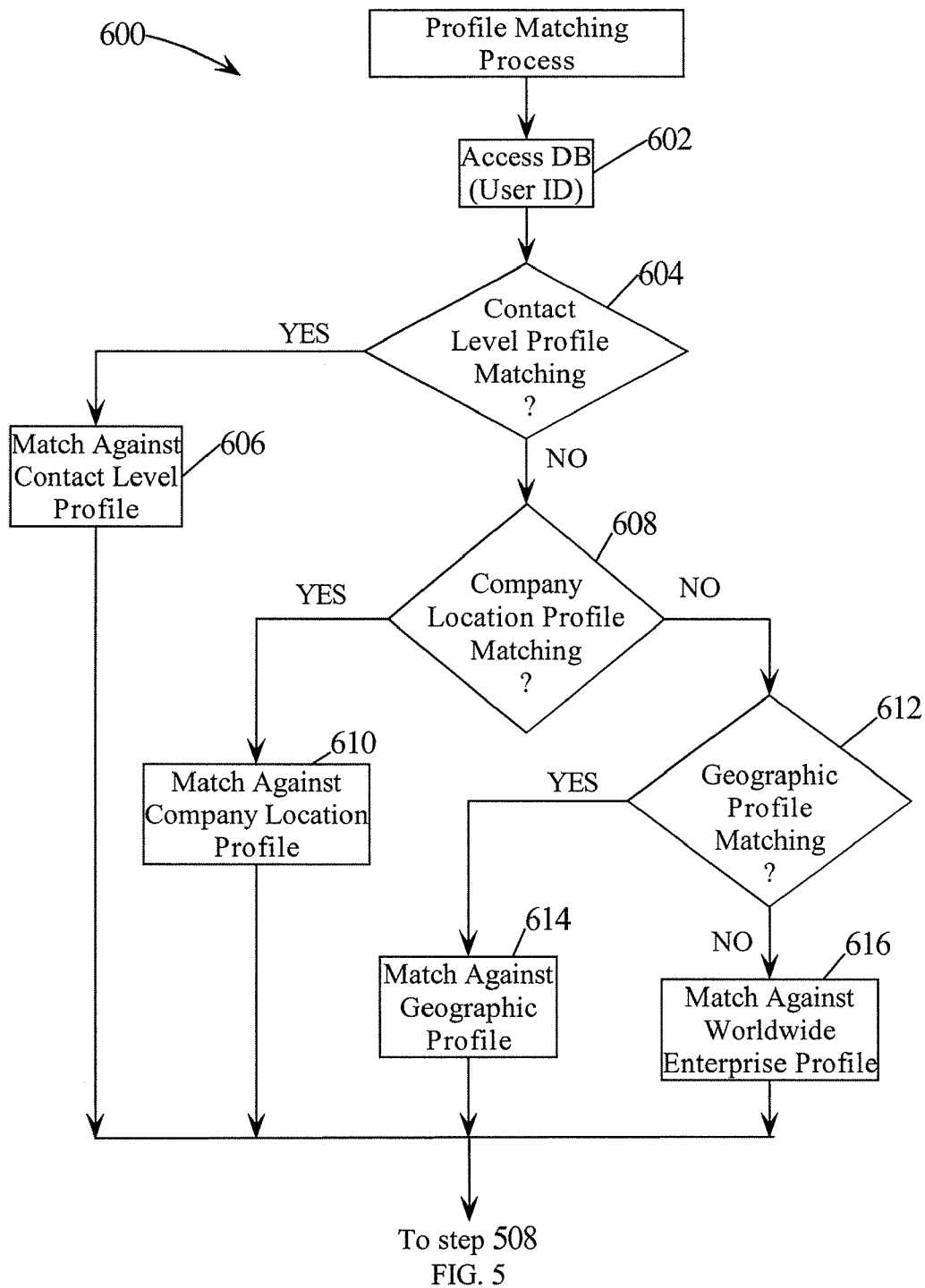
FIG. 6 illustrates a methodology for retrieving recipient profiles which may be used in conjunction with the methodology of FIG. 4.

FIG. 6 illustrates a methodology 600 for retrieving a recipient profile which may be used in conjunction with the methodology of FIG. 5. Methodology 600 provides for a hierarchical mechanism for package entitlements.

In step 602, a database containing partner profiles is accessed using a recipient-supplied UsernDentification (UserID) and the package requested. The identification may be, for example, the UserID entered in block 406 of FIG. 4.

If the package criteria pertains to a contact level attribute, step 604, that profile is used for matching, step 606, to determine entitlements in the appropriate one (whether single-valued or multi-valued attribute) of steps 510 and 514, FIG. 5. Otherwise, entitlements are checked in a hierarchical fashion through a set of organizational profiles, via the "F" branch of step 604.

If, in step 608, the package criteria pertains to a location level, the company location level profile is used for matching, step 610. Otherwise, in step 612 it is determined if the package criteria pertains to a geographic level attribute. If so, the geographic level profile is used for matching against the package profile, step 614. Otherwise, the worldwide enterprise level profile is used for matching, step 616.

Each of steps 606, 610, 614 and 616 returns to step 508, FIG. 5, to determine entitlements in the respective one of the decision blocks 510 and 514, depending on whether the attribute is single-valued (510) or multi-valued (514).

Figure 7:
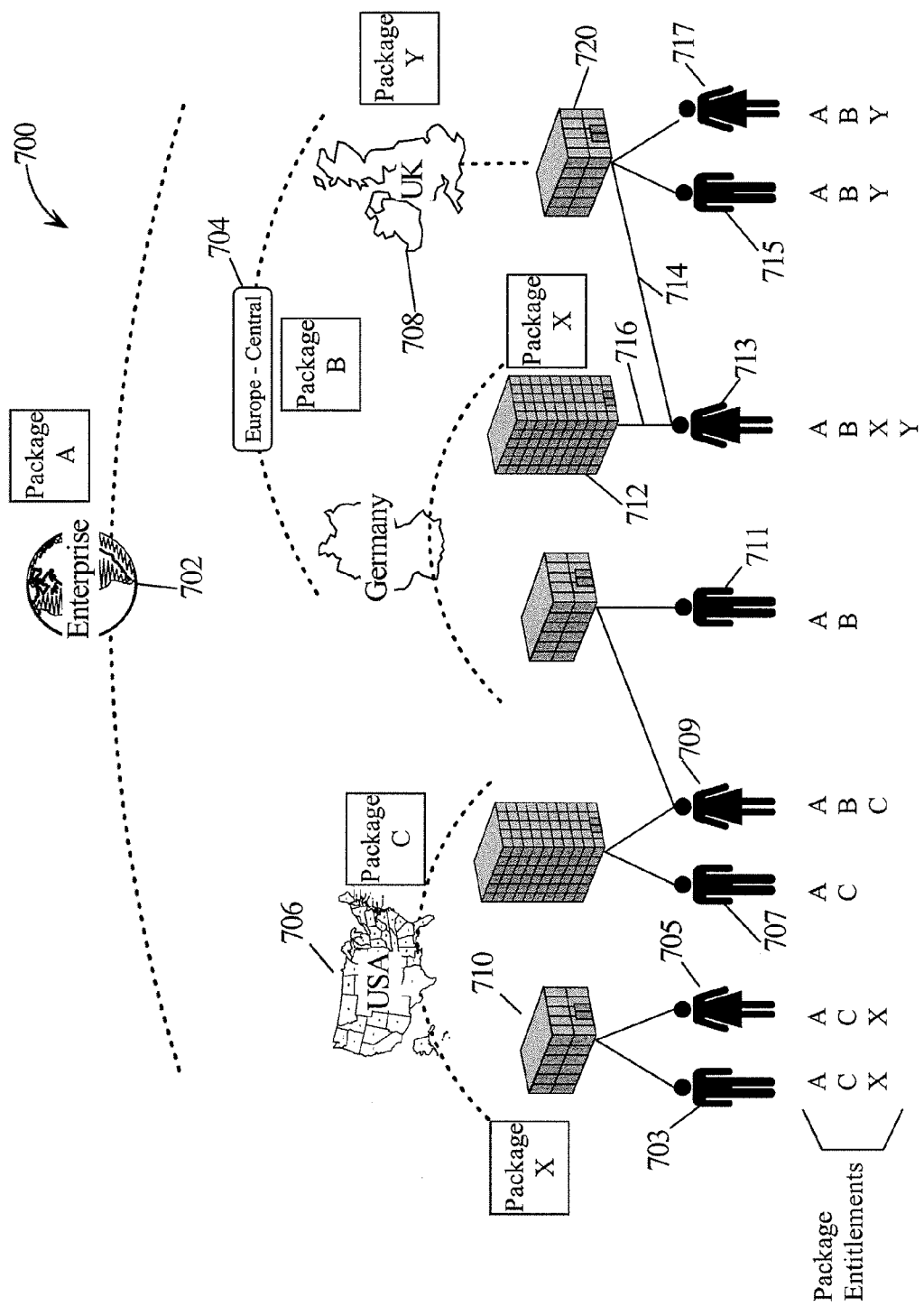
FIG. 7 schematically illustrates a hierarchical entitlement relationship in accordance with the principles of the present invention.

This may be further understood by referring to FIG. 7, schematically illustrating an exemplary hierarchical association of entitlements, 700.

Package A is associated with enterprise 702. Thus, a recipient requesting package A may be matched against an enterprise level profile to determine that recipients entitlement, in an embodiment of the present invention in accordance with methodology 600, FIG. 6. Thus, in this exemplary embodiment each of recipients 703, 705, 707, 709, 711, 713, 715 and 717 matching the enterprise level profile are entitled to package A.

Packages B, C and Y are associated with geographic level entitles 704 (Europe-Central), 706 (US) and 708 (UK), respectively. Thus a recipient requesting one or more of these packages may be matched against a geographic level profile to determine that recipients entitlement. In this exemplary embodiment, recipients 709, 711, 713, 715 and 717 matching a geographic level profile are entitled to package B, recipients 703, 705, 707 and 709 matching a geographical level profile are entitled to package C and recipients 713, 715 and 717 matching a geographic level profile are also entitled to package Y.

Package X is associated with locations 710 and 712, whereby recipients requesting this package may be matched against a location level profile. Recipients 703 and 705 at location 710 matching the location level profile are entitled to package X as is recipient 713 matching the location level profile at location 712.

Note that a particular contact may match against multiple package profiles either through association to multiple location level profiles as indicated by link 714 and 716.

Figure 8:
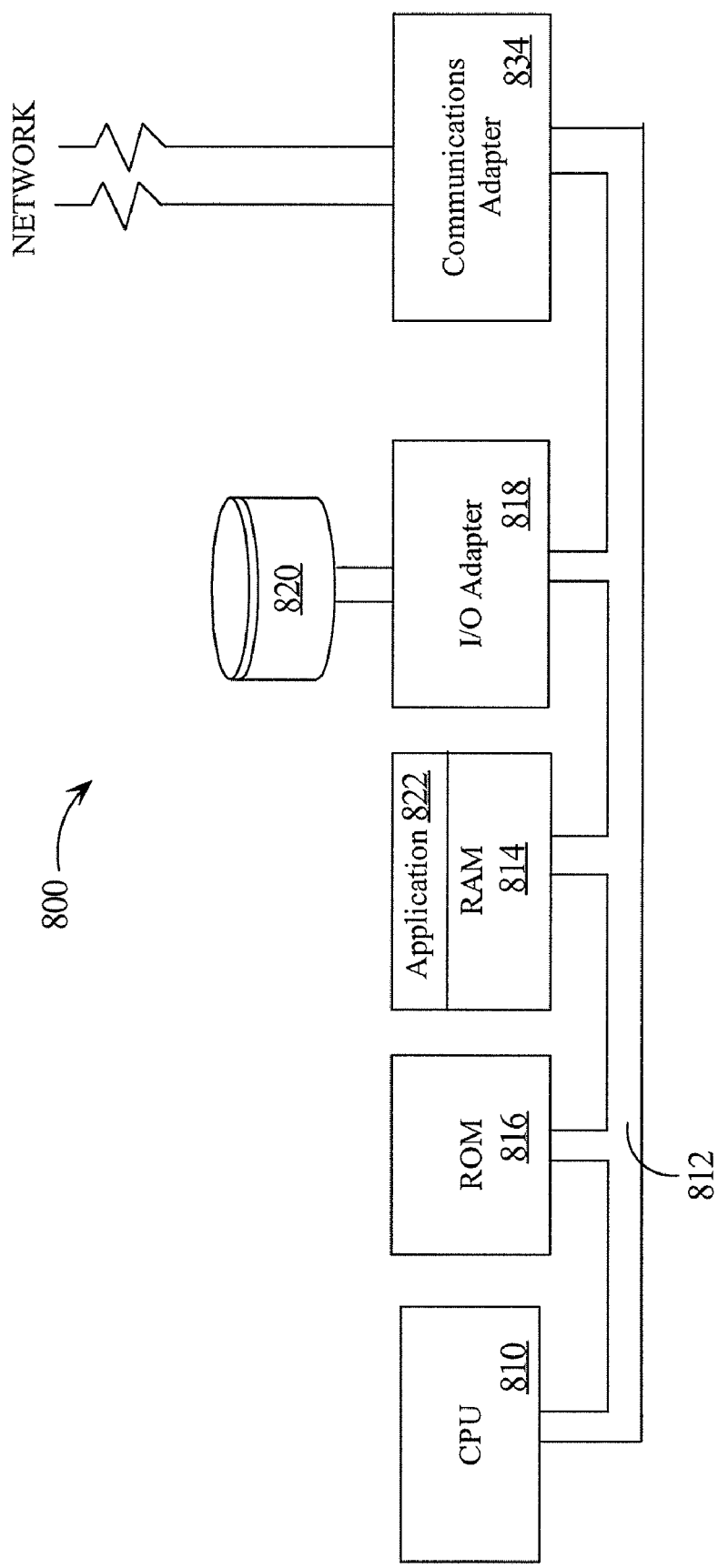
FIG. 8 illustrates, in block diagram form, a data processing system which may be used in conjunction with the methodologies employed in the present inventive principles.

FIG. 8 illustrates an exemplary hardware configuration of data processing system 800 in accordance with the subject invention. The system, in conjunction with the methodologies illustrated in FIGS. 3-6 may be used, to perform entitlement management as described hereinabove, in accordance with the present inventive principles. Data processing system 800 includes central processing unit (CPU) 810, such as a conventional microprocessor, and a number of other units interconnected via system bus 812. Data processing system 800 also includes random access memory (RAM) 814, read only memory (ROM) 816 and input/output (I/O) adapter 818 for connecting peripheral devices such as disk units 820 to bus 812. System 800 also includes communication adapter 834 for connecting data processing system 800 to a data processing network, such as Internet 204, FIG. 2, enabling the system to communicate with other systems. CPU 810 may include other circuitry not shown herein, which will include circuitry commonly found within a microprocessor, e.g. execution units, bus interface units, arithmetic logic units, etc. CPU 810 may also reside on a single integrated circuit.

Preferred implementations of the invention include implementations as a computer system programmed to execute the method or methods described herein, and as a computer program product. According to the computer system implementation, sets of instructions, shown as application 822, for executing the method or methods are resident in the random access memory 814 of one or more computer systems configured generally as described above. These sets of instructions, in conjunction with system components that execute them, may be used to perform entitlement management operations as described hereinabove. Until required by the computer system, the set of instructions may be stored as a computer program product in another computer memory, for example, in disk drive 820 (which may include a removable memory such as an optical disk or floppy disk for eventual use in the disk drive 820). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention as defined by the appended claims.

What is claimed is:

1. A method for entitlement management comprising:
performing by a computer, the steps of:
responsive to a request for a service, determining if a recipient identified in said request is entitled to said service; if said recipient is entitled to said service, delivering said service, wherein said step of determining if said recipient is entitled to said service comprises:
comparing a set of administrator-configurable package profile attributes values associated with a package of services containing said service with corresponding values for said recipient; determining if said service includes a limited number of accesses; and if said service includes a limited number of accesses, decrementing a tracking count associated with the service.

2. The method of claim 1 further comprising:
logging a delivery of said service;
decrementing a number of available instances of said service if said service has a limited usage count; and
sending a message to said recipient indicating said recipient is not entitled to said service if the limited usage count has been consumed.

3. A computer program product embodied in a tangible storage medium, the program product comprising programming instructions for entitlement management, the programming instructions for:
responsive to a request for a service, determining if a recipient identified in said request is entitled to said service; if said recipient is entitled to said service, delivering said service, wherein said programming instructions for determining if said recipient is entitled to said service comprises programming instructions for
comparing a set of administrator-configurable package attributes values associated with a package of services containing said service with corresponding values for said recipient;
determining if said service includes a limited number of accesses; and if said service includes a limited number of accesses, decrementing a tracking count associated with the service.

4. The computer program product of claim 3 further comprising programming instructions for:
logging a delivery of said service;

decrementing a number of available instances of said service if said service has a limited usage count; and sending a message to said recipient indicating said recipient is not entitled to said service, if the limited usage count has been consumed.

5. A data processing system for entitlement management comprising:

circuitry operable for, responsive to a request for a service, determining if a recipient identified in said request is entitled to said service; if said recipient is entitled to said service, delivering said service, wherein said programming instructions for determining if said recipient is entitled to said service comprises programming instructions for comparing a set of administrator-configurable package attributes values associated with a package of services containing said service with corresponding values for said recipient;

circuitry operable for determining if said service includes a limited number of accesses; and circuitry operable for, if said service includes a limited number of accesses, decrementing a tracking count associated with the service.

* * * * *